United States Patent [19]

Nakamura et al.

[11] Patent Number: 4,823,909
[45] Date of Patent: Apr. 25, 1989

[54] VEHICULAR SOUNDPROOF STRUCTURE

[75] Inventors: Mitsuo Nakamura; Tsuyoshi Yamashita, both of Wako, Japan

[73] Assignee: Honda Giken Kogyo Kabushiki Kaisha, Tokyo, Japan

[21] Appl. No.: 102,978

[22] Filed: Sep. 30, 1987

[30] Foreign Application Priority Data

Oct. 1, 1986 [JP] Japan ................. 61-234148

[51] Int. Cl.⁴ .............................................. E04B 1/82
[52] U.S. Cl. ...................... 181/290; 181/291; 181/294
[58] Field of Search ............. 181/290, 291, DIG. 1, 181/294

[56] References Cited

U.S. PATENT DOCUMENTS

| | | | |
|---|---|---|---|
| 4,128,683 | 12/1978 | Nomura et al. | 181/290 X |
| 4,340,129 | 7/1982 | Salyers | 181/291 X |
| 4,488,619 | 12/1984 | O'Neill | 181/290 |
| 4,559,255 | 12/1985 | Shimode et al. | 181/290 X |
| 4,574,915 | 3/1986 | Gahlau et al. | 181/290 |
| 4,705,139 | 11/1987 | Gahlau et al. | 181/290 |
| 4,735,284 | 4/1988 | Gahlau et al. | 181/290 |

*Primary Examiner*—B. R. Fuller
*Attorney, Agent, or Firm*—Armstrong, Nikaido, Marmelstein, Kubovcik & Murray

[57] ABSTRACT

A soundproof structure for vehicle use includes a vehicle body forming panel, a lower side sound absorbing foamed resin layer on the panel, a rigid sound insulating panel on the foamed resin layer, and a press means between the vehicle body forming panel and the sound insulating panel to urge the sound insulating panel toward the former panel, the press means acting to hold the lower side foamed resin layer in compressed state, and an upper side sound absorbing layer being further laminated on the sound insulating panel.

5 Claims, 1 Drawing Sheet

VEHICULAR SOUNDPROOF STRUCTURE

BACKGROUND OF THE INVENTION

1. Field of the Invention

The present invention relates to a vehicular soundproof structure which is applicable to the surfaces of panels forming a vehicle body or chassis.

2. Description of the Prior Art

Various kinds of soundproof structures have conventionally been proposed with an effort to alleviate noises and vibrations which are generated by an engine and other components on the body of a vehicle and come into a vehicle compartment.

As such conventional soundproof structure, Japanese patent application laid-open No. 18538/1986 has made known, for example, the structure consisting of a viscous foamed material layer for sound absorption use, a restricting layer formed of a flexible material such as aluminum foil or rubber sheet, a sound absorbing layer and a skin layer which are laminated in the mentioned order from lower to upper sides on the surface portion of a vehicle body forming panel.

However, the structure known from said Japanese publication requires the step of impregnating the foamed material with a viscous material such as asphalt to provide the viscous foamed material layer, which undesirably increases the number of production steps and the kind of materials used by addition of such viscous material. Moreover, workers must pay attention to handling the viscous material such as asphalt in order to avoid its adhesion to their clothes. Thus, the conventional structure suffers from a problem that its handling is quite laborious.

SUMMARY OF THE INVENTION

In view of the afore-mentioned problems, the present invention aims at providing a soundproof structure which could exhibit an excellent soundproof effect even without use of a viscous material and which is easy to be handled.

For achieving the above purpose, a vehicular soundproof structure according to the invention comprises a vehicle body forming panel with a lower side sound absorbing foamed resin layer provided thereon, and a sound insulating panel of a high rigidity disposed on the surface of the foamed resin layer, wherein between the vehicle body forming panel and the sound insulating panel is disposed a press means which urges and presses the sound insulating panel toward the vehicle body forming panel while compressing the lower side sound absorbing foamed resin layer, and an upper side sound absorbing layer is further laminated on the sound insulating panel.

Owing to the above arrangement, the rigid sound insulating panel is pressed against the vehicle body forming panel by the press means and accordingly the lower side sound absorbing foamed resin layer is pressed toward the vehicle body forming panel in an evenly compressed state. As a result, the lower side sound absorbing foamed resin layer is at the whole area of the lower surface thereof held in intimate contact with the vehicle body forming panel to a sufficient degree. This permits any vibrations occurring at the vehicle body forming panel to be suppressed and alleviated by the lower side sound absorbing foamed resin layer, thereby reducing noises which may be caused by vibrations of the vehicle body forming panel. In addition, no viscous material is required in a soundproof structure according to the invention which can therefore be handled at an improved working efficiency.

It should be noted here that when some spaces or clearances are present between the vehicle body forming panel and the lower side sound absorbing foamed resin layer due to, for example, some projected and/or recessed portions formed on the vehicle body forming panel, they may allow generation of confined low noises of a low frequency. However, in the afore-mentioned vehicular soundproof structure according to the invention, since the lower side sound absorbing foamed resin layer is placed in intimate contact with the vehicle body forming panel, there appears no space between them which could serve as a source of generation of low frequency confined noises.

BRIEF DESCRIPTION OF THE DRAWINGS

In the attached drawings.

DESCRIPTION OF PREFERRED EMBODIMENTS

Figure 1:
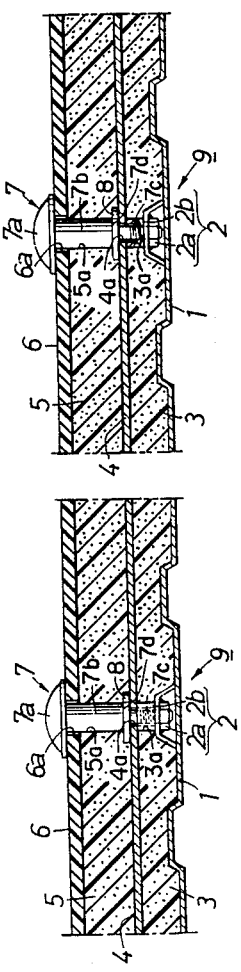
FIG. 1 is a sectional view of a first embodiment of a soundproof structure for vehicle use according to the present invention.

Hereinafter some preferred embodiments according to the invention will be described in conjunction with the drawings.

Incidentally, corresponding members are indicated by the same reference numerals throughout the drawings and any overlapping description which would go into detail will be omitted.

FIG. 1 shows a sectional view of the first embodiment according to the invention in which an intermediate part of the structure is omitted from illustration.

A vehicle body forming panel 1 as illustrated is a floor panel having some projected and recessed portions for increasing its strength. This vehicle body forming panel 1 may not be limited to the floor panel but be embodied in an engine bulkhead or dashboard or any other desired portions, of course.

The vehicle body forming panel 1 is fixedly mounted on its surface with nut-formed brackets 2 each comprising a nut 2a and a cylindrical part 2b. Further on the surface of the panel 1 is laid a lower side sound absorbing foamed resin layer 3 having bracket through holes 3a. The cylindrical part 2b of each bracket 2 is inserted through the holes 3a. The lower side sound absorbing foamed resin layer 3 is constituted by a heat-responsive type foamed polyurethane layer but, as its forming material, any other appropriate foamed resin materials may be employed.

On the surface of the lower side sound absorbing foamed resin layer 3 are laminated a sound insulating panel 4 having bolt through holes 4a, an upper side sound absorbing layer 5 having bolt through holes 5a and a skin layer 6 having bolt through holes 6a in the mentioned order. The sound insulating panel 4 is formed by a rigid (or hard) resin layer or an iron sheet layer whereas the upper side sound absorbing layer 5 is formed of the same material as the lower side sound absorbing foamed resin layer 3. Using the same material for forming the lower side layer 3 and the upper side layer 5 like this embodiment conveniently leads to less number of kinds of materials to be used. However it would be apparent that a different kind of material from that of the lower side layer 3 can be used for the upper side layer 5.

A stepped bolt 7 penetrates through the bolt through holes 4a, 5a and 6a and this bolt 7 comprises a head portion 7a, a columnar portion 7b projecting vertically from the central part of the lower surface of the head portion 7a, a screw portion 7c formed at the lower end of the columnar portion 7b and a step 7d provided between the columnar portion 7b and the screw portion 7c. Moreover, the stepped bolt 7, a washer 8 abutting against the step 7d of the bolt 7 and the afore-mentioned nut-formed bracket 2 together constitute a press means 9.

The screw portion 7c of the bolt 7 penetrates through the bolt through hole 4a and the cylindrical part 2a of the bracket 2 and is tightened into the nut 2a. The sound insulating panel 4 is clamped and fixed in place between the washer 8 abutting against the bolt step 7d and the upper end surface of cylindrical part 2b. In this state of assembly, the washer 8 acts on and urges the sound insulating panel 4 downwardly. In other words, through the function of press means 9, the sound insulating panel 4 having a high rigidity is held pressed toward the vehicle body forming panel 1. Consequently, the lower side sound absorbing foamed resin layer 3 is subject to a pressing force which presses it toward the panel 1 in a substantially evenly compressed state. Such compression is effected in the direction of thickness of the layer 3 and the rate of compression thereof can be set in certain range effective to permit no generation or remaining of spaces between the surface of vehicle body forming panel 1 and the lower surface of foamed resin layer 3. As a standard level, the rate of compression comes in a range of about 10 to 80%.

The skin layer 6 is pressed downwards by the outer periphery of the lower surface of the bolt head portion 7a whereby the skin layer 6 and upper side sound absorbing layer 5 are fixed onto the sound insulating panel 4. Distance between the lower surface of bolt head portion 7a and the lower surface of washer 8 is determined substantially equal to that between the upper surface of skin layer 6 and the lower surface of upper side sound absorbing layer 5, as a result of which the upper side sound absorbing layer 5 is almost free of a compression force. That is, in spite of the fact that the upper side sound absorbing layer 5, held in non-compressed state, and the lower side sound absorbing foamed resin layer 3, in a compressed state, are formed of the same material (heat-responsive type foamed polyurethane) as mentioned above, their densities are different from each other in the assembled structure.

According to the first embodiment of the invention arranged in the above-mentioned manner, the rigid sound insulating panel 4 is pressed toward the vehicle body forming panel 1 by the press means 9 and therefore the lower side sound absorbing foamed resin layer 3 is pressed in a uniformly compressed state against the panel 1. With this, the whole area of the lower surface of the foamed resin layer 3 comes into a sufficiently intimate contact with the vehicle body forming panel 1 so that the panel 1 can be suppressed its vibratory movements by the presence of the foamed resin layer 3, thereby enabling noises to be reduced which would be otherwise caused by such vibration of the panel 1.

Although the vehicle body forming panel 1 is formed to have a ruggedness thereon in order to enhance its rigidity, the lower side sound absorbing foamed resin layer 3 is pressed against the vehicle body forming panel 1 so as to have a satisfactory intimate contact therebetween. In consequence, any spaces can be eliminated from between the foamed resin layer 3 and the panel 1, which in turn reduces generation of confined noises having a low frequency. Any vibrations and/or noises of a low frequency can be absorbed at the lower side foamed resin layer 3 having a high density while vibrations and/or noises of a high frequency can be absorbed at the upper side sound absorbing layer 5 which is relatively low in density.

Figure 2:
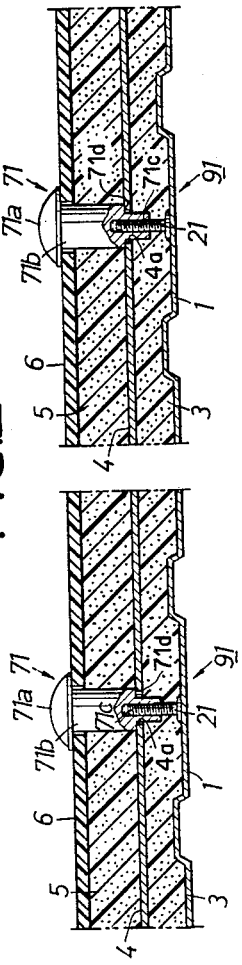
FIG. 2 is a sectional view of a second embodiment and FIG. 3 is a sectional view of a third embodiment.

FIG. 2 shows a sectional view of the second embodiment according to the invention. This second embodiment differs from the first embodiment in that a press means 91 is used instead of the means 9 of the preceding embodiment.

The press means 91 is constituted by a stud bolt 21 implanted onto the surface of vehicle body forming panel 1 and a stepped nut 71 screw-fitted to the stud bolt 21. The stepped nut 71 includes a head portion 71a and a columnar portion 71b vertically projecting from the central part of the lower surface of the head portion 71a. Furthermore, a female screw portion 71c is formed at the lower part of the columnar portion 71b so as to open at the lower end of the latter and a step 71d is provided between the columnar portion 71b and the female screw portion 71c. The head portion 71a, columnar portion 71b, female screw portion 71c and step 71d together constitute the stepped nut 71.

The female screw portion 71c of stepped bolt 71 penetrates through the sound insulating panel 4 and is tightened to the stud bolt 21. The sound insulating panel 4 is pressed downwards by the step 71d, that is, the panel 4 of a high rigidity is pressed toward the vehicle body forming panel 1 by the press means 91. As a consequence, the lower side sound absorbing foamed resin layer 3 is kept compressed between the sound insulating panel 4 and the vehicle body forming panel 1 like the first embodiment.

Meanwhile, the head portion 71a of the stepped nut 71 presses at the outer periphery of the lower surface thereof the skin layer 6 in a downward direction, thereby fixing the skin layer 6 and upper side sound absorbing layer 5 onto the sound insulating panel 4. The distance from the lower surface of nut head portion 71a to the lower surface of step 71d has been set substantially equal to the distance between the upper surface of skin layer 6 and the lower surface of upper side sound absorbing layer 5. Accordingly, the upper side layer 5 is in almost non-compressed condition.

Other construction of this second embodiment is the same as the first embodiment. And this embodiment operates similarly to the first embodiment.

Figure 3:
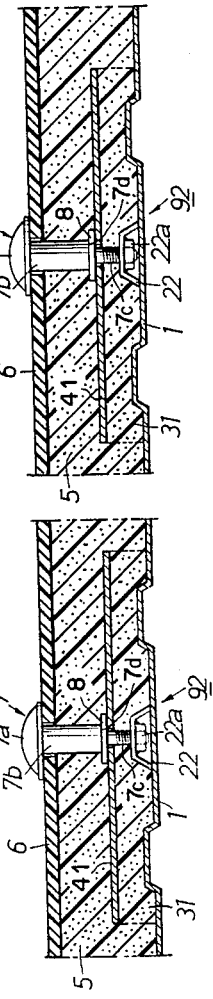

FIG. 3 shows a sectional view of the third embodiment according to the invention, which differs from the first embodiment in employing a press means 92 in place of the press means 9.

The press means 92 is constituted by a nut-formed bracket 22 secured to the surface of the vehicle body forming panel 1, the stepped bolt 7 tightened to the bracket 22 and the washer 8. The stepped nut 7 and washer 8 of this embodiment are constructed similarly as the stepped nut 7 and washer 8 of the foregoing first embodiment. The nut-formed bracket 22 corresponds to the nut-formed bracket 2 of the first embodiment but with the cylindrical part 2a having been omitted therefrom.

In addition, in contrast with the first embodiment having the lower side sound absorbing foamed resin layer 3 and sound insulating panel 4 extended over the whole surface of the vehicle body forming panel 1, this third embodiment has a different feature that a lower side sound absorbing foamed resin layer 31 and a sound insulating panel 41 are laid over to cover only a part of the surface of the vehicle body forming panel 1. Namely, in this third embodiment, the soundproof structure according to the present invention has been employed only in those parts of a vehicle body which are liable to generate vibrations and noises of, particularly, a low frequency.

The remaining construction of this embodiment is the same as the first embodiment.

The parts in the thus constructed third embodiment to which the soundproof structure according to the invention has been applied operate in the similar manner as the first embodiment.

The present invention has been detailed in the above in connection with some embodiments thereof, however, it should not be limited to the embodiments only and may be modified in various ways without departing from the spirit of the invention which will be defined in the appended claims.

For example, instead of using a sole member (stepped bolt 7 or stepped nut 71) for simultaneously fixing the skin layer 6 and sound insulating panel 4 (41) in place, it is possible to provide separate fixing means for the panel 4 (41) and the skin layer 6, respectively. Moreover, a felt material can be used in place of the foamed resin material for forming the upper side sound absorbing layer 5, and when a thick carpet is used therefor, the skin layer 6 may be omitted. Furthermore, the lower side sound absorbing foamed resin layer 3 (31) or the upper side sound absorbing layer 5 may be divided into a plurality of layers.

What is claimed is:

1. A vehicular soundproof structure comprising a vehicle body forming panel, a lower side sound absorbing foamed resin layer disposed on a surface of the vehicle body forming panel, a sound insulating panel having a high rigidity and disposed on a surface of the lower side sound absorbing foamed resin layer, an upper side sound absorbing layer disposed on the sound insulating panel, and a press means extending between said vehicle body forming panel and said sound insulating panel for pressing the sound insulating panel toward the vehicle body forming panel while compressing said lower side sound absorbing foamed resin layer which is disposed between the sound insulating panel and the vehicle body forming panel.

2. A structure of claim 1 further comprising a skin layer laminated on said upper side sound absorbing layer, said press means serving also as means for fixing said skin layer and said upper side sound absorbing layer onto said sound insulating panel.

3. A structure of claim 2, wherein said upper side sound absorbing layer is in a state almost free of a compression force.

4. A structure of claim 1, wherein said press means comprises a first member fixed to the vehicle body forming panel and extending toward the sound insulating panel while penetrating the lower side sound absorbing foamed resin layer, and a second member which is abutted against the sound insulating panel from a side opposite to the vehicle body forming panel, said first member and said second member being adjustably screw-fitted to each other through a hole formed in the sound insulating panel.

5. A structure of claim 2, wherein said press means serves to hold constant a distance between the sound insulating panel and the skin layer.

* * * * *